(12) United States Patent
Marroni et al.

(10) Patent No.: US 7,760,526 B2
(45) Date of Patent: Jul. 20, 2010

(54) METHOD AND DEVICE FOR THE CONTROL OF A THREE-PHASE INVERTER

(75) Inventors: Ettore Marroni, Arezzo (IT); David Martini, Arezzo (IT)

(73) Assignee: Power-One Italy, S.p.A., Arrezzo (IT)

( * ) Notice: Subject to any disclaimer, the term of this patent is extended or adjusted under 35 U.S.C. 154(b) by 92 days.

(21) Appl. No.: 11/349,620

(22) Filed: Feb. 8, 2006

(65) Prior Publication Data
US 2006/0186855 A1 Aug. 24, 2006

(51) Int. Cl.
*H02M 3/24* (2006.01)
*H02M 7/44* (2006.01)
(52) U.S. Cl. .............................. 363/95; 363/96; 363/98
(58) Field of Classification Search .................. 363/95, 363/96, 98
See application file for complete search history.

(56) References Cited

U.S. PATENT DOCUMENTS

| | | | | |
|---|---|---|---|---|
| 4,354,249 A | * | 10/1982 | King et al. | 708/622 |
| 5,475,293 A | * | 12/1995 | Sakai et al. | 318/802 |
| 6,239,997 B1 | * | 5/2001 | Deng | 363/95 |
| 2002/0030365 A1 | * | 3/2002 | Underwood et al. | 290/40 B |
| 2002/0101749 A1 | * | 8/2002 | Ulrich | 363/95 |
| 2005/0187752 A1 | * | 8/2005 | Colby et al. | 703/19 |

FOREIGN PATENT DOCUMENTS

| | | |
|---|---|---|
| DE | 3236071 | 1/1984 |
| EP | 1 369 984 | 10/2003 |
| FR | 2831349 | 4/2003 |

OTHER PUBLICATIONS

XP-002335651, Field Oriented Control of 3-Phase AC-Motors, Texas Instruments Europe, Feb. 1998.

* cited by examiner

*Primary Examiner*—Edward Tso
*Assistant Examiner*—Johali A Torres Ruiz
(74) *Attorney, Agent, or Firm*—Waddey & Patterson; Mark J. Patterson; Gary L. Montle

(57) ABSTRACT

A method of controlling an inverter to includes determining the components of a phasor representing the output current from the inverter in a fixed reference system; determining the components of the current phasor in a reference system rotating at a velocity equal to the velocity of rotation of the phasor representing the grid voltage; and comparing the components of the current phasor in the rotating reference system with a reference, again expressed in the rotating reference system, to determine an error signal, by means of which the inverter is controlled.

13 Claims, 6 Drawing Sheets

METHOD AND DEVICE FOR THE CONTROL OF A THREE-PHASE INVERTER

CROSS-REFERENCES TO RELATED APPLICATIONS

This application is a Non-Provisional Utility application which claims benefit of co-pending European Patent Application Serial No. EU 05425059.2 filed Feb. 9, 2005, entitled "Method and Device for the Control of a Three-Phase Inverter" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates in general to the control of three-phase inverters used to supply electrical power from a generic electrical power source to a three-phase grid, to which a load with known characteristics may be applied. More specifically, the present invention relates to a method and to a device for regulating an inverter in parallel to the grid.

In the use of renewable energies and more generally alternative energies, it is frequently necessary to transfer power generated by a generic source to a three-phase electrical grid. For example, it may be necessary to transfer the electrical power obtained from a fuel cell generator, or from a photovoltaic solar panel, to a three-phase grid. The characteristics of the generator vary greatly, for example as a function of environmental conditions (in the case of photovoltaic solar panels). Therefore, the problem arises of transferring electrical power in the form of current, with non-constant characteristics, to a grid with an alternating voltage with precise and constant characteristics.

Transfer of electrical power typically takes place through an inverter, which is controlled by a pulse-width modulated (PWM) signal so as to supply the three phases of the grid with currents suitably synchronized with the phase voltages. In order to synchronize the output current of the inverter with the grid voltage, "Phase Locked Loop" (PLL) control algorithms have been used. These algorithms have some drawbacks and limits.

BRIEF SUMMARY OF THE INVENTION

One object of the present invention is to provide a method for the control of an inverter to synchronize the output current of the inverter with the grid voltage in a manner which is more efficient than conventional methods based on a PLL algorithm.

Essentially, the invention provides a method for regulating an inverter connected to an electrical power source and in parallel to a three-phase grid to supply power generated by the source to the three-phase grid in a manner synchronized with respect to the voltage on the phases of the grid. One embodiment of the method includes the following steps:

determining the components of a phasor representing the output current from the inverter in a fixed reference system;

determining the components of the current phasor in a reference system rotating at a velocity equal to the velocity of rotation of the phasor representing the grid voltage; and comparing the components of the current phasor in the rotating reference system with a reference, again expressed in the rotating reference system, to determine an error signal, by means of which said inverter is controlled.

According to another embodiment of the method according to the invention, the following steps are provided:

transforming the three phase voltages on the grid into two components of said voltage phasor, rotating in a fixed reference system;

transforming the output current from the inverter into two components of said current phasor, rotating in a fixed reference system;

determining the components of the current phasor with respect to a reference system rotating with said voltage phasor;

obtaining an error signal by comparing the components of the current phasor in the rotating reference system with the components in said rotating reference system of a reference current phasor; and controlling the inverter as a function of said error signal.

In a further embodiment of the invention, the three phase voltages are transformed into the two components of the voltage phasor expressed in the fixed reference system by means of a Clarke transformation. Likewise, the three phase output currents from the inverter can be transformed into the two components of the current phasor expressed in the fixed reference by means of a Clarke transformation.

In a practical embodiment of the method according to the invention, the components of the current phasor in the rotating reference are determined by means of a scalar product between the current phasor and the voltage phasor.

According to another embodiment of the method of the present invention, the two components in the rotating reference system of the error signal are transformed into two components of the error signal in the fixed reference system and these two components are transformed into three phase error signals to control the three output phases of the inverter.

For example, the components of the error signal in the rotating reference system are transformed into components of the error signal in the fixed reference system by means of modulation of the error signal expressed in the rotating reference on the voltage phasor in the fixed reference system.

The components of the error signal in the fixed reference system are transformed into three phase error signals, for example, and preferably by means of an inverse Clarke transform.

Advantageously, the components of the reference current phasor can be determined on the basis of a preset apparent power value and of a preset power factor value. Alternatively, the components of the reference current phasor (I_dq_rif_rot) are determined on the basis of preset active power and reactive power values.

According to an improved embodiment of the method according to the present invention, a control of the maximum output power or current from said inverter is also provided.

According to a different aspect of the invention, the invention relates to a system comprising: an electrical power source; a three-phase inverter connected in parallel to a three-phase grid, the input of which receives power from said source, to supply power generated by said source to the electrical power grid, in synchronism with the grid voltage; a control to drive said inverter. Characteristically, the control is based on an algorithm which implements a method as defined above.

DETAILED DESCRIPTION OF THE INVENTION

Figure 1:
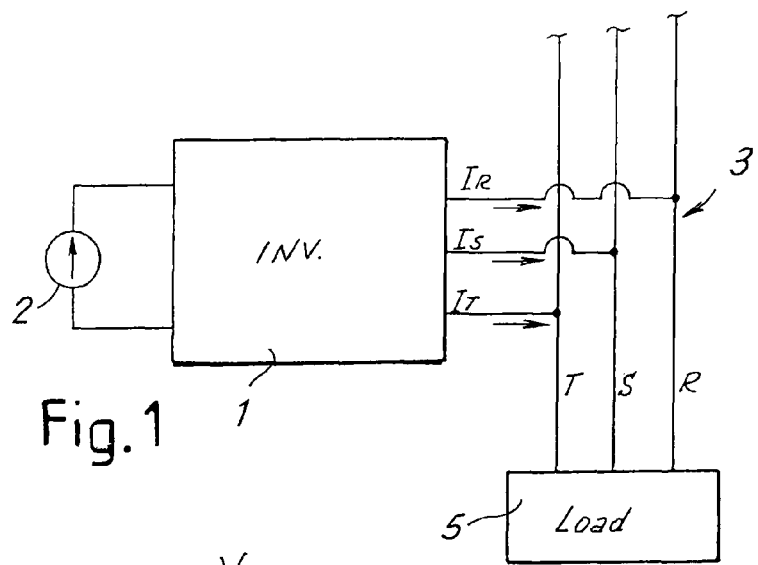
FIG. 1 schematically shows an inverter connected to a three-phase grid, with a generic load, and at the input to an electrical power source.

FIG. 1 schematically shows a three-phase inverter 1, the input of which is connected to a generic electrical power source 2, for example a photovoltaic panel or the like. The output of the three-phase inverter 1 is connected to a three-phase grid 3, the three phases of which are indicated with R, S and T. In the example shown, a generic load 5 is connected to the grid 3. The inverter 1 can be used to at least partly supply electrical power to the load 5 connected to the grid 3. The grid 3 supplies the remaining power required by the load 5 with respect to the power supplied through the inverter 1 from the alternative source 2, or absorbs the excess power supplied by said source 2 with respect to the power required by the load 5. However, it must be understood that the description provided herein with reference to the methods of regulating the inverter 1 is also valid in the case in which the inverter 1 supplies electrical power solely to the three-phase grid 3, rather than to supply power to a load 5.

Figure 5:
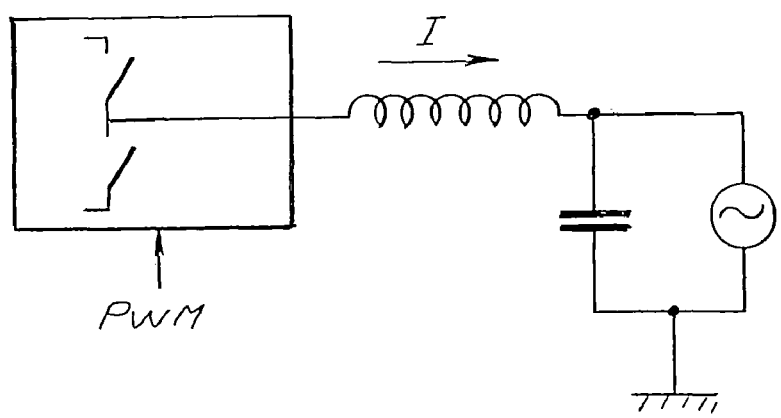
FIG. 5 schematically shows the inverter and an output coil thereof with the relative output capacitor.

In FIG. 1, $I_R$, $I_S$ and $I_T$ indicate the three output coil currents from the inverter 1. FIG. 5 schematically shows the inverter with one of the output coils and the output capacitor, connected to the grid, represented symbolically by a single-phase alternating voltage source. In practice, the inverter will be equipped with three output coils, one for each phase, on which the three currents circulate, and each of which is associated with a respective output capacitor, with the grid and, optionally, the load in parallel.

Figure 2:
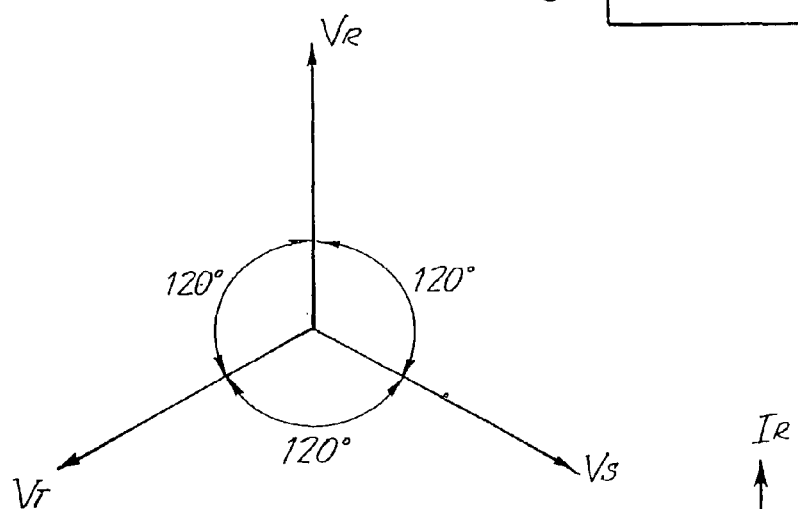
FIG. 2 is a vector graphical representation of the three phase voltages on the inverter output coils.
Figure 3:
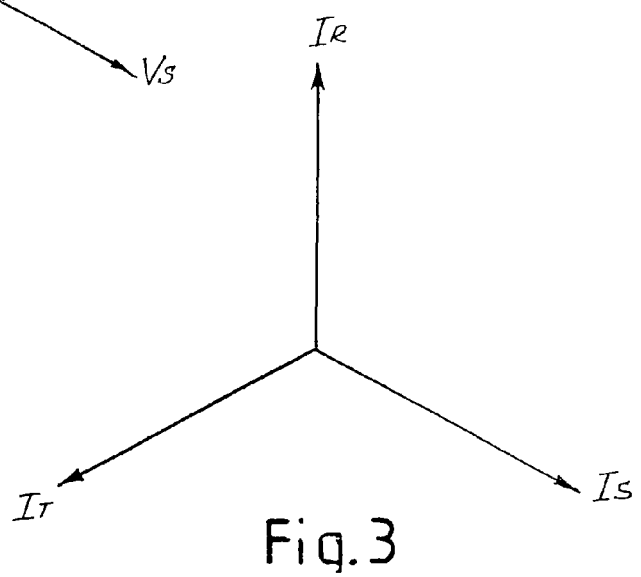
FIG. 3 is a vector graphical representation of the three currents through the inverter output coils.

A fixed frequency alternating current, for example, typically 50 Hz or 60 Hz depending on the country, herein also referred to as pulse frequency ω, is present on each of the three phases of the electrical grid 3. The three voltages in the three phases are displaced by 120°. In FIG. 2, the three voltages are represented by the three vectors $V_R$, $V_S$ and $V_T$, while in FIG. 3 the three currents $I_R$, $I_S$ and $I_T$ are indicated on the three output coils of the inverter.

As known in the art, three-phase quantities can be represented with a single vector, also called a phasor, rotating with respect to a fixed reference D, Q (also called "complex space") at an angular rotation velocity equal to the pulse ω, that is, at the grid frequency.

Given the balanced three-phase triads:

$$\begin{cases} va = V\cos(\omega t) \\ vb = V\cos(\omega t - 2*\pi/3) \\ vc = V\cos(\omega t - 4*\pi/3) \end{cases} \quad \begin{cases} ia = I\cos(\omega t + \varphi) \\ ib = I\cos(\omega t - 2\pi/3 + \varphi) \\ ic = I\cos(\omega t - 4\pi/3 + \varphi) \end{cases}$$

we obtain two phasors:

$$\overline{V} = V\exp(j\omega t)$$

$$\overline{I} = I\exp(j\omega t)*\exp(j\phi)$$

For a three-phase system of the type represented by the electrical grid 3, the transformation from the three-phase triad $V_R$, $V_S$, $V_T$ to the phasor V is obtained by means of the following transformation matrix:

$$T = \frac{2}{3} * \begin{vmatrix} 1 & -0.5 & -0.5 \\ 0 & \sqrt{3}/2 & -\sqrt{3}/2 \end{vmatrix}$$

This transformation is known as a Clarke transformation. The transformation matrix T maintains in the complex space the peak amplitude of the three-phase triad. The inverse transformation is given by the inverse matrix of T:

$$\begin{vmatrix} 1 & 0 \\ -0.5 & \sqrt{3}/2 \\ -0.5 & -\sqrt{3}/2 \end{vmatrix}$$

Figure 4:
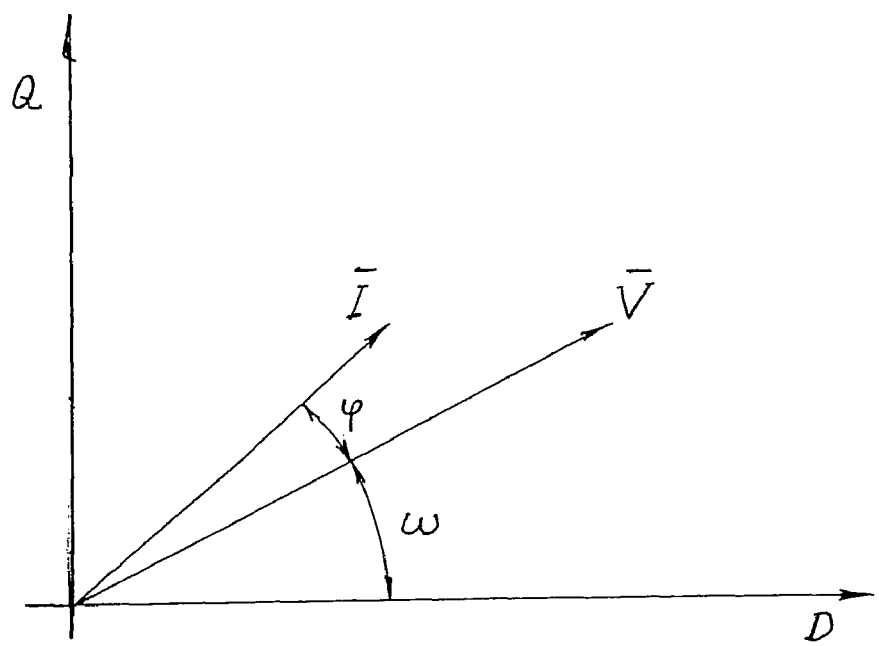
FIG. 4 is a graphical representation of the voltage and of the current as phasors in the reference D, Q.

FIG. 4 represents the phasor V in the plane DQ. The phasor I, obtained from transformation of the three-phase triad $I_R$, $I_S$, $I_T$, is represented on the same complex plane. The phase angle, that is, the displacement between current and voltage, is indicated with φ. As the voltage phasor V rotates in the fixed complex plane DQ at a known rotation velocity ω, it is possible to refer the current phasor to a reference system rotating at the same rotation velocity ω. In this reference system, which is here called the rotating system DQ, the phasor I is fixed with respect to the phasor V and displaced by the phase angle φ.

The inverter 1 must be controlled so that it supplies current to the three phases R, S, T of the three-phase grid 3 in a manner synchronized with the voltages of these phases. In other words, the current supplied by the inverter 1 must be "locked" to the voltage phase. Moreover, the current supplied by the inverter 1 must have, with respect to the grid voltage, a desired phase angle φ. If the inverter is used exclusively to transfer the electrical power supplied by the alternative source 2 to the three-phase grid 3, this current must not only be synchronized with the grid voltage, but must also be in phase with it, that is, it must be φ=0. If, on the other hand, the power supplied by the inverter 1 is used to feed a generic load 5, as this will generally have a power factor (cos φ) different from 1, the current supplied by the inverter 1 can be displaced by an angle suitable to compensate the power factor of the load.

The present invention relates to the method to control the inverter 1 to obtain these functions. This method will now be described in detail with reference to the following diagrams, in which the steps of the control algorithm are represented in the form of block diagrams.

Figure 6:
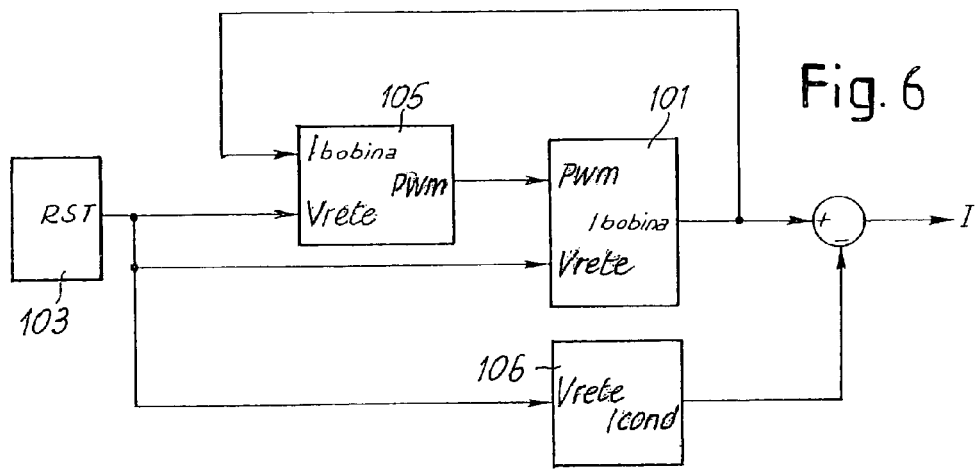
FIG. 6 is a functional block diagram of the inverter, including an output coil and the relative capacitor, connected to the corresponding phase of the three-phase grid.

FIG. 6 is a block diagram of a system including a grid, the inverter, and the relative control block. A block schematically representing the three-phase grid is indicated with 103, the block representing the inverter with 101, the control block with 105 and the output capacitor of the inverter with 106. The following parameters are also indicated in the diagram of FIG. 6:

Ibobina: the current of the generic coil of the inverter;
Vrete: the grid voltage;
PWM: the PWM control signal of the inverter; and
Icond: the current on the output capacitor of the inverter.

Figure 7:
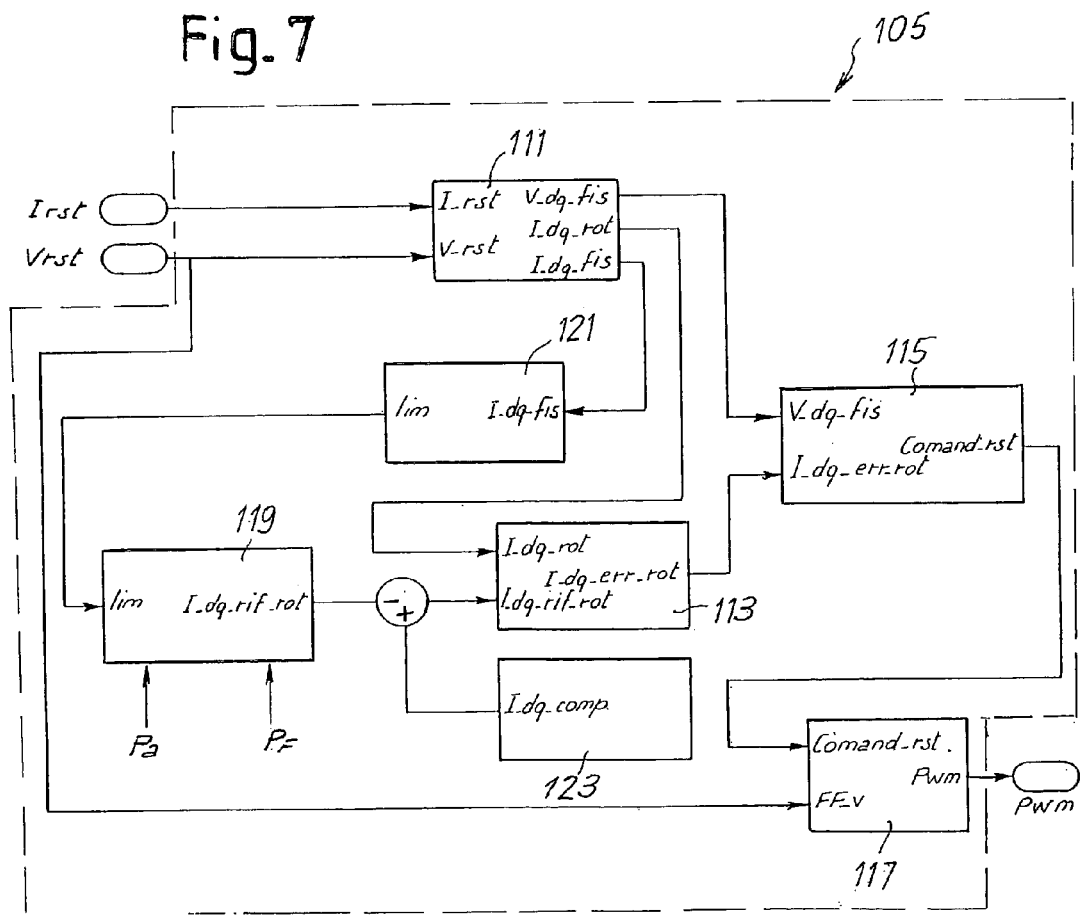
FIG. 7 is an overall block diagram of one embodiment of the inverter control of the present invention.

The diagram in FIG. 7 schematically shows the functions of the control block 105 represented in FIG. 6. The values of the grid voltages on the three phases (Vrst) and of the three output coil currents (Irst) from the inverter are supplied to a block 111 which determines the components of the voltage and current phasors in the fixed reference system DQ and in the rotating system DQ, as defined above. The components of the voltage and current phasors in the fixed DQ reference system are indicated by V_dq_fis and I_dq_fis, and the components of the current phasor in the rotating DQ reference are indicated by I_dq_rot. These components are supplied at the output from block 111 and are determined therein in the way to be described herein with reference to the block diagrams of the subsequent figures, which illustrate one embodiment of the control algorithm. The value I_dq_fis is used by a control system of the maximum current value, described herein, which sets a limit to the current supplied by the inverter. The values of the components of the current phasor in the rotating reference (I_dq_rot) are used in a block 113 to determine an error signal I_dq_err_rot. This error signal has two components, in the rotating reference system DQ, of the error between the components I_dq_rot, determined by the control system, and the reference components I_dq_rif_rot, set a priori as shall be described hereunder. In substance, the block 113 determines the difference of the values of the components in the rotating system DQ of the current phasor I with respect to a reference current phasor I_ref.

A subsequent block 115 generates a command Comand_rst which, in a block 117, is transformed into a PWM signal to control the three phases of the inverter 1. The error value I_dq_err_rot calculated by the block 113 is represented by the components of the error on the rotating reference DQ. Therefore, an inverse transformation is performed in block 115 to determine the values of the error signal in the fixed system DQ and then from this to the system RST, to obtain the values of the control signal for the three phases of the inverter.

Figure 8:
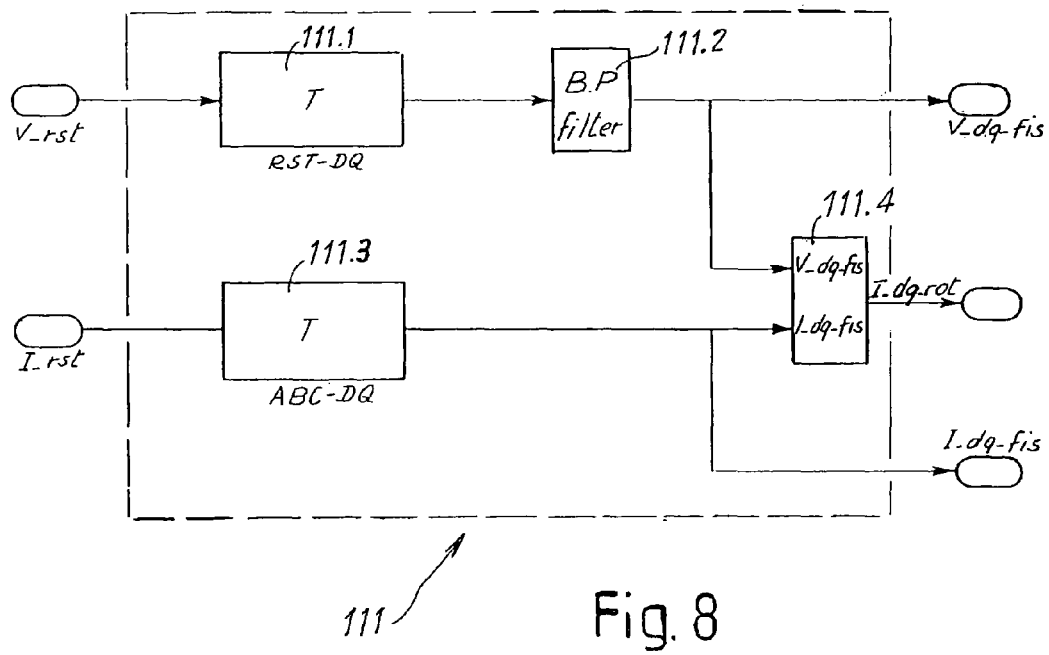
FIG. 8 is block diagram of one embodiment of functional block 111 of the inverter control of FIG. 7.
Figure 9:
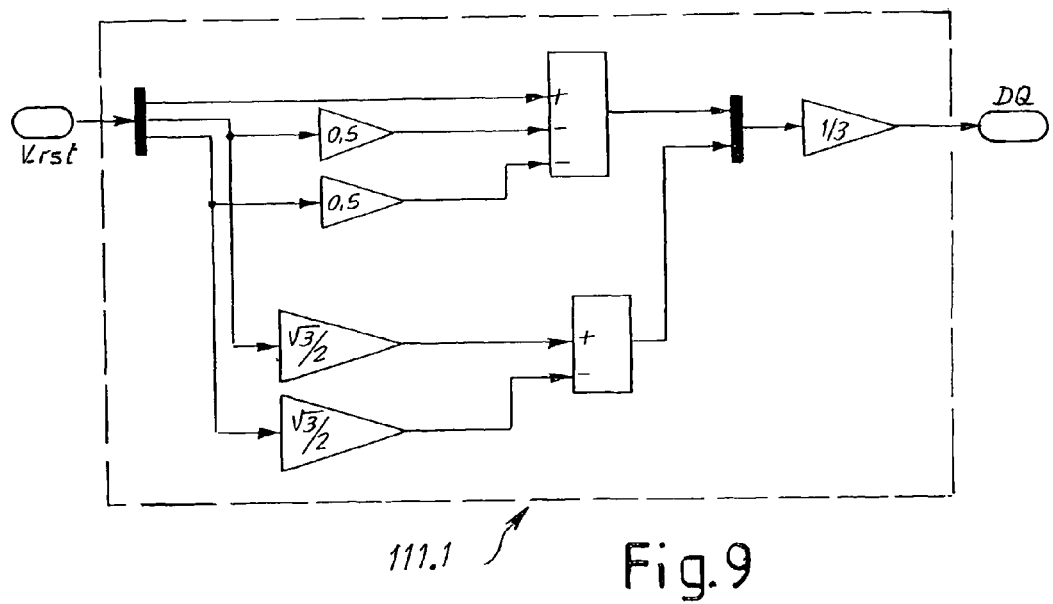
FIG. 9 is block diagram of one embodiment of functional block 111.1 shown in the embodiment of FIGS. 7 and 8.

The function of block 111 is illustrated in detail in the block diagram of FIG. 8. The grid voltage V_rst is transformed in block 111.1 into components of the voltage phasor in the fixed system DQ by means of the transformation represented by the matrix T defined above. From a viewpoint of the calculation algorithm, the matrix product between the components $V_R$, $V_S$, $V_T$ of the three-phase triad and the transformation matrix T can be obtained, for example, with the diagram in FIG. 9, it being understood that other diagrams may be possible. In addition to the components of the voltage phasor rotating at the angular velocity ω, the components of the phasors representing the higher harmonics will also be obtained at the output of block 111.1. These components must be eliminated by means of a band-pass filter represented by block 111.2 in FIG. 8, centered on the grid frequency ω. Therefore, components Vd and Vq of the voltage phasor in the fixed reference DQ, indicated with V_dq_fis, are obtained at the output of filter 111.2

Again with reference to FIG. 8, a transformation of the current values on the three output coils of the inverter 1 from the RST system to the fixed reference system DQ is performed in e block 111.3 with a Clarke transformation entirely analogous to the one performed in the block 111.1. The values of the components Id, Iq of the current phasor I in the fixed reference system DQ are obtained at the output from block 111.3, said components being indicated as a whole with I_dq_fis.

In the regulation method according to the invention, the components of the current phasor I are then obtained in the rotating system DQ at the rotation velocity ω, that is, the current phasor I is projected onto the voltage phasor V by means of a scalar product. The result of this operation is represented by the components I_dq_rot of the current phasor I expressed in the rotating system DQ. The operation is performed in block 111.4, at the input of which the values of the components Vd, Vq of the voltage phasor and Id, Iq of the current phasor in the fixed reference DQ are obtained. Mathematically, the scalar product of I_dq_fis on V_dq_fis is $$(\overline{I},\overline{V})=(Id+jIq)*(Vd+jVq)'$$

where j is the imaginary unit. The algorithm that performs this operation can be implemented in various ways and those skilled in the art can select the most suitable diagram each time.

Finally, therefore, the components of the voltage phasor in the fixed reference DQ, and of the current phasor both in the fixed reference system DQ and in the rotating reference system DQ are obtained at the output of block 111.

Figure 10:
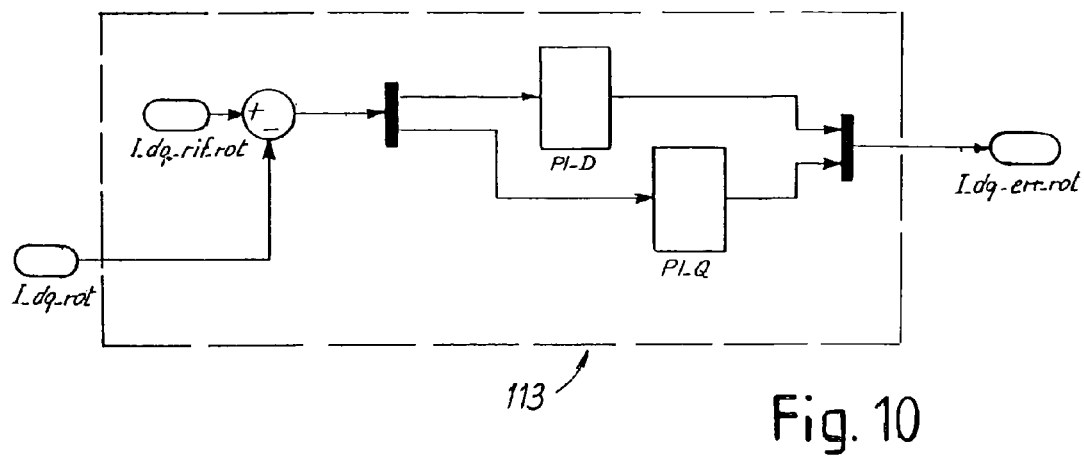
FIG. 10 is block diagram of one embodiment of functional block 113 of the inverter control of FIG. 7.

The components I_dq_rot of the current phasor expressed in the rotating system DQ are used in the block 113 (FIG. 7) to determine a correction signal of the error represented by respective components, again expressed in the rotating system DQ, indicated with I_dq_err_rot. The function of block 113 is represented in detail in the block diagram of FIG. 10, which shows one of the possible methods of implementation. The components I_dq_rot of the current phasor expressed in the rotating reference system DQ are subtracted from respective references I_dq_rif_rot, which are defined a priori in the way described herein. The error signals are sent to two proportional-integral (PI) regulation blocks indicated with PI_Q and PI_D, to obtain the correction signal I_dq_err_rot expressed in the rotating reference DQ.

In order to be used, this correction signal must be transformed with an inverse transformation from the rotating reference system DQ to the fixed reference system DQ and then from the latter to the RST system, so as to provide three signals for driving the three phases of the inverter 1.

Figure 11:
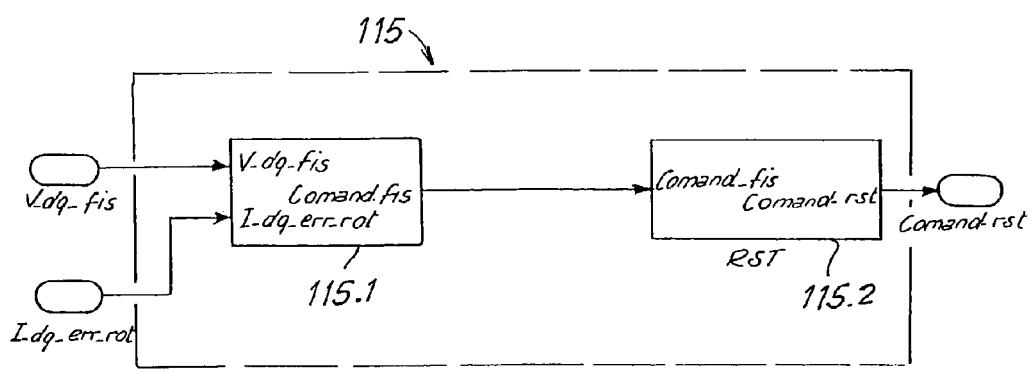
FIG. 11 is block diagram of one embodiment of functional block 115 of the inverter control of FIG. 7.

In block 115 (FIG. 7) this double inverse transformation is performed from the rotating system DQ to the fixed reference system DQ, using the components V_dq_fis. The functions of the block 115 are represented in greater detail in FIG. 11, where block 115.1 is the transformation block from the rotating reference system DQ to the fixed reference system DQ and block 115.2 is the transformation block from the fixed reference system DQ to the system RST (inverse Clarke transform). The transformation algorithms from the rotating reference system DQ to the fixed reference system DQ, and the algorithm that performs the inverse Clarke transformation, can be easily implemented by those skilled in the art and are not described in detail herein, as different computational solutions may be adopted.

In substance, in block 115.1 the DC error signal modulates the amplitude of the rotating vector in the following way:

$(Ed+jEq)$=DC error: output from the PI regulator $(Vd+jvq)$=expression of the rotating reference in voltage $(Ed+jEq)*(Vd+jVq)=(EdVd-EqVq)+j(EdVq+EqVd)$ where $(EdVd-EqVq)+j(EdVq+EqVd)$ is the expression on the fixed reference of the command signal. This signal is then transformed from fixed DQ to RST with the inverse Clarke transform.

The command obtained at the output from block 115, indicated with Comand_rst, forms the signal that is used to control the inverter 1.

In substance, with the procedure described, on the basis of the difference between the components Id and Iq of the current phasor—obtained from the values of the currents in the output coils on the three phases of the inverter 1—and the components of reference I_dq_rif, both in the rotating reference signal DQ, a command to drive the inverter in the system RST is determined.

As the corresponding grid voltage is applied at the ends of the output coil on each phase of the inverter 1, it is necessary to add to the command Comand_rst thus obtained a feed-forward signal (indicated with FF_v) on the grid voltage, as shown by the block 117 (FIG. 7), to obtain the PWM driving signal of the inverter 1.

Figure 12:
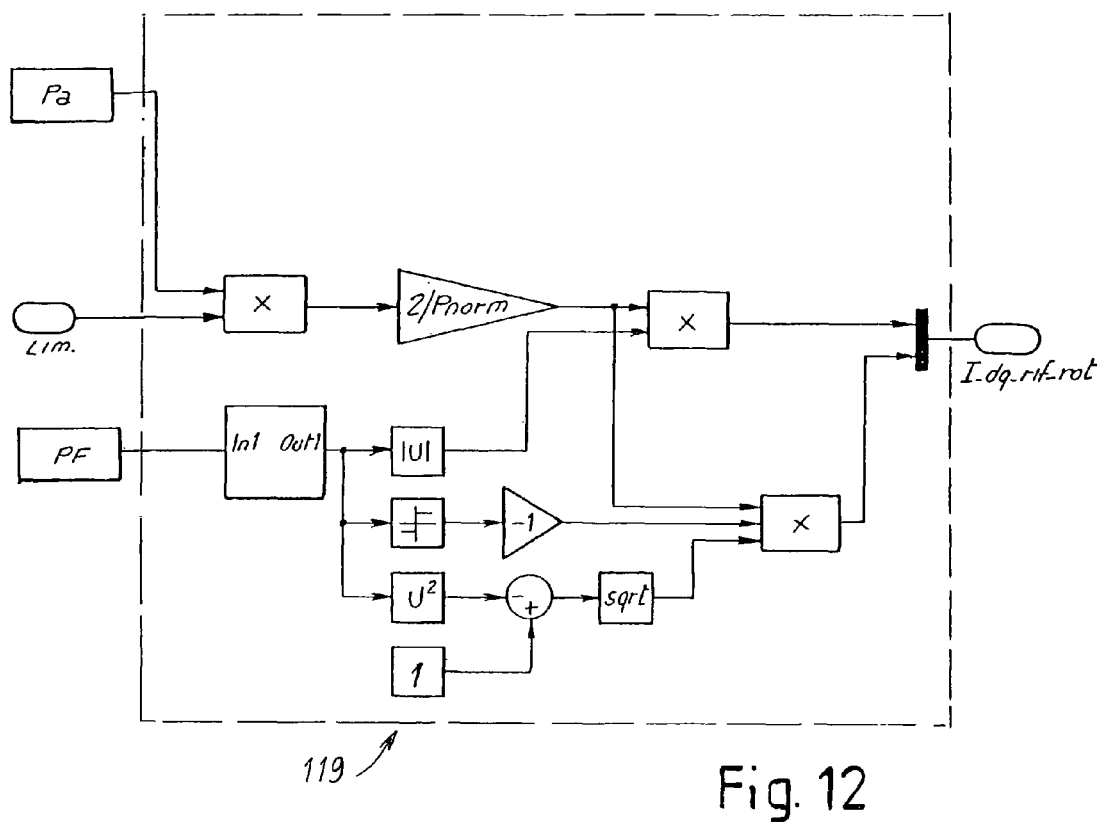
FIG. 12 is block diagram of one embodiment of functional block 119 of the inverter control of FIG. 7.

The signal of reference I_dq_rif_rot is generated starting from user parameters, for example from the apparent power, indicated with Pa, and from the power factor PF. As mentioned above, if the inverter 1 has the function of supplying power to the three-phase electrical grid 3, the power factor will be set equal to 1, while if the power supplied by the source 2 supplies a load 5, which has a characteristic of its own, for example ohmic-capacitive or ohmic-inductive, the power factor PF set will generally be different from 1 and tend to correct displacement between current and voltage induced by the nature of the load. In the diagram of FIG. 7 the reference I_dq_rif_rot is generated by block 119, which performs the algorithm in one embodiment as shown in FIG. 12 and the description of which is provided herein.

As the active power does not depend on the sign of the phase displacement angle between voltage and current $P=Pa*abs(PF)$ where abs( ) indicates the absolute value. Moreover $Pa^2=P^2+Q^2$ where P and Q are respectively the active and reactive power. Therefore $Q^2=Pa^2P^2=Pa^2(1-PF^2)$ i.e.

$Q=sgn(PF)*Pa*\sqrt{1-PF^2}$ where sgn( ) is the sign function.

Therefore, the user sets the physical parameters Pa and PF and obtains P and Q; the apparent power is normalized with respect to $$\frac{2}{Vn^2}$$

where Vn is the peak value of the voltage, with respect to which the voltage and current values are normalized. Considering that $$\begin{cases} P = Pa*\text{abs}(PF) \\ Q = sgn(PF)*Pa*\sqrt{1-PF^2} \end{cases}$$

and that $$\begin{cases} \text{I\_d\_rot} = 2*\frac{P}{Vn^2} \\ \text{I\_q\_rot} = -2*\frac{Q}{Vn^2} \end{cases}$$

we obtain the two references $$\begin{cases} \text{I\_d\_rif\_rot} = 2*\frac{P}{Vn^2} = \frac{2}{Vn^2}*Pa*\text{abs}(PF) \\ \text{I\_q\_rif\_rot} = -2*\frac{Q}{Vn^2} = -\frac{2}{Vn^2}*Pa*sgn(PF)*\sqrt{1-PF^2} \end{cases}$$

Alternatively, with a similar procedure the active power and the reactive power can be set as user parameters rather than the apparent power Pa and the power factor PF.

As the algorithm works at a constant power, it is important in the case of a temporary interruption in the grid voltage to prevent an excessive increase in the current supplied by the inverter.

Limiting of the apparent power Pa is obtained, as can be seen in the diagram in FIG. 12, by multiplying the value Pa set by the user by a limiting factor indicated with "lim" and supplied by a block 121 (FIG. 7) on the basis of the run-time values of the current, obtained as follows.

On the fixed reference the current reading is equal to $\bar{I}=I\exp(j\omega t)*\exp(j\phi)$, i.e.

$I^2=Id^2+Iq^2$

As the apparent power Pa is given by $Pa=Veff*Ieff$ the current peak is equal to $$Ipk = \frac{Pa*\sqrt{2}}{Veff}.$$

By normalizing with respect to Vn, the maximum length of the phasor in the fixed reference becomes:

$$Ik_{max} = \frac{1}{Vn} * \frac{Pa*\sqrt{2}}{Veff}.$$

As $I^2=Id^2+Iq^2$, irrespective of the phase angle $\phi$ we must obtain:

$$Id^2 + Iq^2 \leq \left(\frac{1}{Vn} * \frac{Pa*\sqrt{2}}{Veff}\right)^2 = Ipk^2$$

Figure 13:
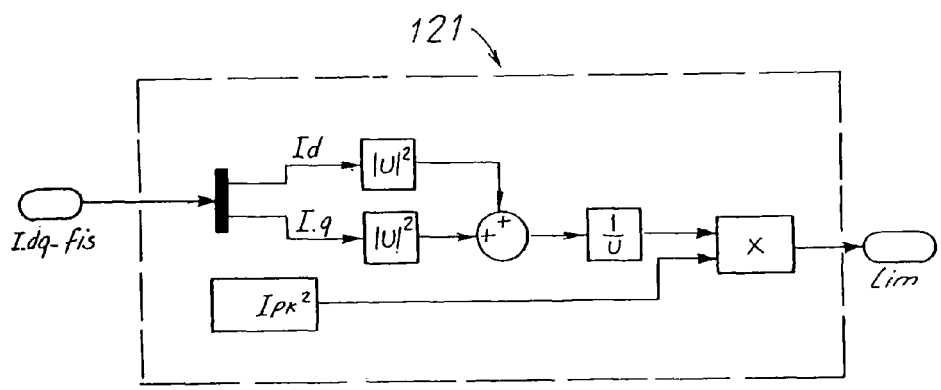
FIG. 13 is block diagram of one embodiment of functional block 121 of the inverter control of FIG. 7.

The value $Id^2+Iq^2$ is calculated as run time, while $Ipk^2$ is a physical constant which the user sets. From these parameters we obtain a quantity Z thus defined:

$$Z=Ipk^2/(Id^2+Iq^2)$$

which is calculated as run time. After determining the parameter Z, as a function of the value of the current I_dq_fis, two situations are obtained:

Z>1: when the current I_dq_fis is below the set threshold
Z<1 when the current I_dq_fis is above the set threshold To maintain the current value below the preset maximum threshold, the limiting parameter "lim" is generated, the value of which is equal to the value of Z when Z<1 and equal to 1 when Z>1. This parameter multiplies the parameter of apparent power Pa set by the user (see FIG. 12). One embodiment of the algorithm to calculate the limiting parameter is shown in FIG. 13, limiting the power which returns to the grid.

In general, in an inverter starting from the PWM signal, extraction of the modulating signal takes place by means of an LC filter. Nonetheless, when connected in parallel to the grid, the capacitor becomes a load for the grid. This must therefore be compensated. In fact, another block 123 is also represented in the diagram in FIG. 7, to compensate for the current absorbed by the output capacitor, which supplies a compensation current that is added to the reference current I_dq_rif_rot obtained as described above.

Thus, although there have been described particular embodiments of the present invention of a new and useful Method and Device for the Control of a Three-Phase Inverter, it is not intended that such references be construed as limitations upon the scope of this invention except as set forth in the following claims.

What is claimed is:

1. A method for regulating an inverter connected to an electrical power source and in parallel to a three-phase grid to supply power generated by said source to said three-phase grid, comprising the steps of:
   determining two components of a voltage phasor representing a grid voltage in a fixed reference system;
   determining two components of a current phasor representing an output current from the inverter in a fixed reference system;
   combining the current phasor and the voltage phasor to determine components of a current phasor representing an output current from the inverter in a rotating reference system rotating at a velocity equal to a velocity of rotation of the phasor representing the grid voltage,
   generating a reference phasor in the rotating reference system in accordance with user-defined power parameters;
   comparing the components of the current phasor in the rotating reference system with the reference phasor in the rotating reference system, to determine an error signal; and
   generating a driver signal of the inverter, wherein said driver signal is the reference phasor modulated by the error signal.

2. The method of claim 1 wherein the three phase voltages are transformed into the two components of the voltage phasor expressed in the fixed reference system by a Clarke transformation.

3. The method of claim 1, wherein the three phase output currents from the inverter are transformed into the two components of the current phasor expressed in the fixed reference by a Clarke transformation.

4. The method of claim 1, wherein the components of the current phasor in the rotating reference are determined by means of a scalar product between the current phasor and the voltage phasor, and wherein the scalar product further comprises a complex conjugate operation.

5. The method of claim 1, wherein the two components in the rotating reference system of the error signal are transformed into two components of the error signal in the fixed reference system, and wherein the two components of the error signal are transformed into three phase error signals to control the three output phases of the inverter.

6. The method of claim 5, wherein the components of the error signal in the rotating reference system are transformed into components of the error signal in the fixed reference system by modulation of the error signal expressed in the rotating reference on the voltage phasor in the fixed reference system.

7. The method of claim 6, wherein the components of the error signal in the fixed reference system are transformed into three phase error signals by an inverse Clarke transform.

8. The method of claim 1, wherein at least two desired power parameters are user-defined and the power parameters are associated with an apparent power value and a power factor value for the reference phasor.

9. The method of claim 1, wherein at least two desired power parameters are user-defined and the power parameters are associated with active power and reactive power values for the reference phasor.

10. The method of claim 1 further comprising control of the maximum output power or current from said inverter.

11. A system comprising: an electrical power source, a three-phase inverter, and a three-phase grid, the inverter connected in parallel to a three-phase grid, the inverter having an input which receives power from said source to supply power generated by said source to the three-phase grid, and a control functional to drive said inverter, said control being functional to
   determine components of a voltage phasor representing a grid voltage in a fixed reference system;
   determine components of a current phasor representing an output current from the inverter in a fixed reference system;
   project the components of the current phasor into the voltage phasor to determine components of the current phasor in a reference system rotating at a velocity equal to a velocity of rotation of a phasor representing a voltage on the three-phase grid and having constant coefficients associated with power dimensions;
   define a reference phasor expressed in the rotating reference system in accordance with at least one user-defined power parameter;

compare the components of the current phasor in the rotating reference system with the reference phasor to determine an error signal; and define an inverter driver signal representative of the reference phasor modulated by the error signal.

12. A method of controlling a three-phase inverter having an output coupled to a three-phase grid, the method comprising:

detecting a three-phase grid voltage;

detecting a three-phase inverter current output;

determining real and imaginary components of a voltage phasor representing said grid voltage in a fixed reference system;

determining real and imaginary components of a current phasor representing said inverter current output in a fixed reference system;

combining said current phasor components and said voltage phasor components to obtain components of a current phasor expressed in a rotating reference system, said rotating reference system having an angular rotation velocity equal to a grid frequency, said components of said current phasor expressed in said rotating reference system having constant coefficients associated with power dimensions;

generating a reference phasor in accordance with user-defined and predetermined power parameters;

comparing said components of said current phasor expressed in said rotating reference system to said reference phasor to generate a correction signal expressed in said rotating system.

13. The method of claim 12, further comprising the steps of:

transforming said correction signal from said rotating reference system to obtain components of said correction signal expressed in said fixed reference system; and transforming said correction signal expressed in said fixed reference system to obtain components of said correction signal comprising three signals for driving three phases of said inverter.

* * * * *